Patented May 27, 1941

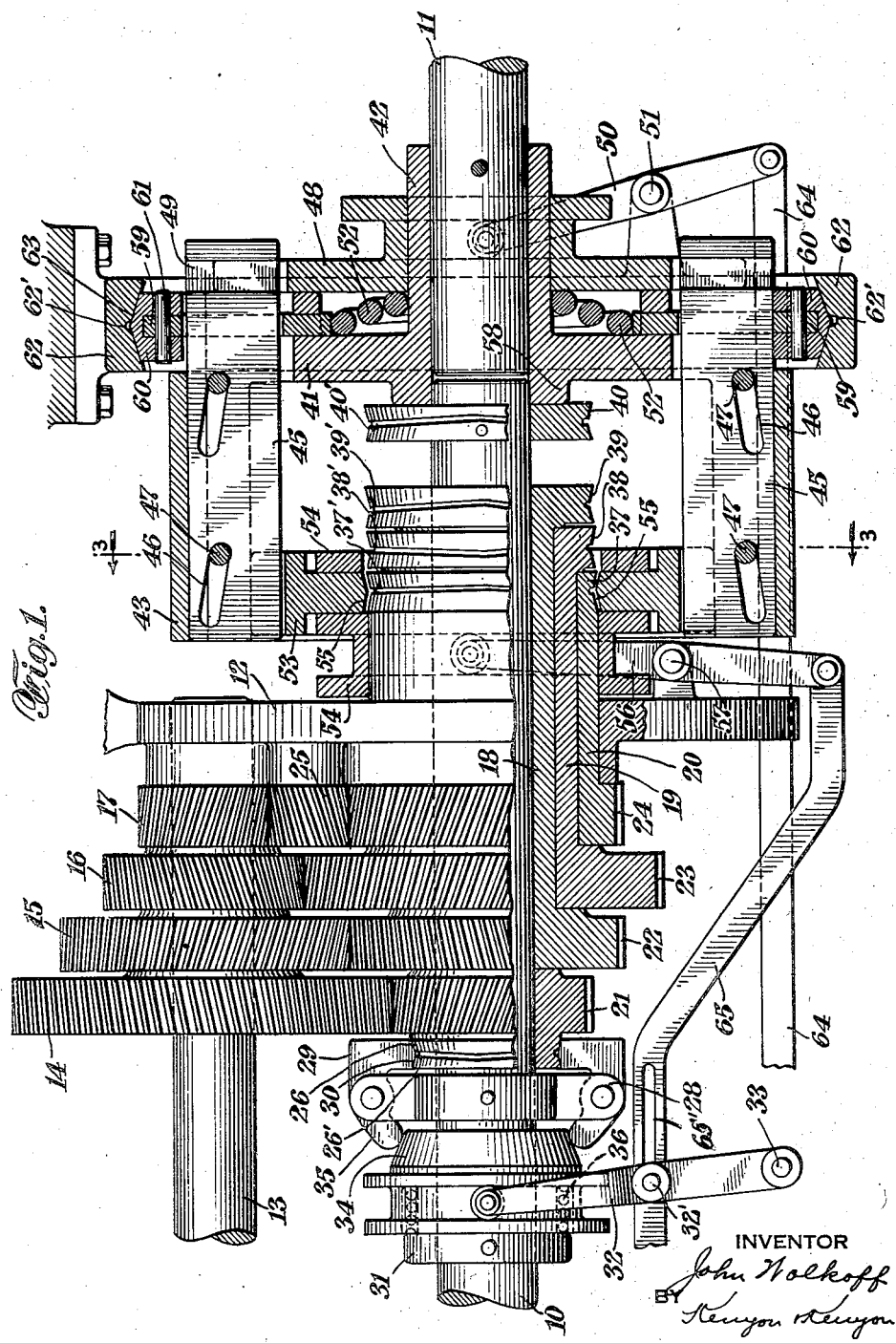

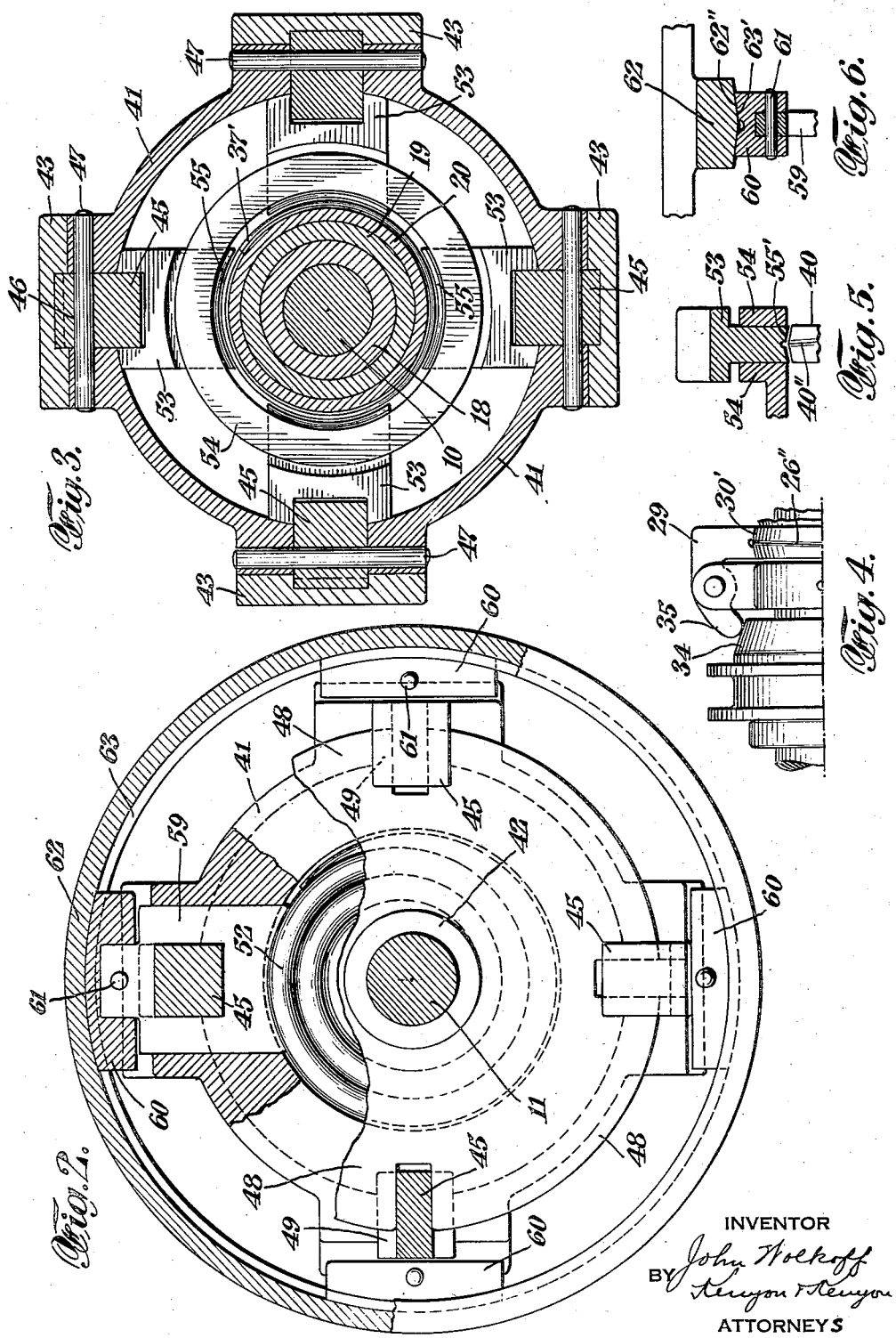

2,243,548

UNITED STATES PATENT OFFICE 2,243,548

POWER TRANSMITTING DEVICE

John Wolkoff, Newark, N. J.

Application May 24, 1938, Serial No. 209,638

8 Claims. (Cl. 192—4)

This invention relates to power transmitting devices and particularly to power transmitting devices embodying speed changing mechanism.

In my Patent No. 1,759,335 there is disclosed an automobile transmission in which the different speed gears are always in mesh and power is transmitted from the driving shaft to the driven shaft by means of selected clutch means either directly or through one of the speed gears and in which a braking mechanism is controlled by the clutch operating mechanism.

This invention has for its object to improve the clutching means and brake mechanism in transmission devices of the type disclosed in said Patent 1,759,335.

Other objects, novel features and advantages of this invention will be apparent from the following specification and accompanying drawings, wherein:

Fig. 1 is a longitudinal sectional view of a power transmitting device embodying the invention;

Fig. 2 is an end view partially broken away;

Fig. 3 is a section on the line 3—3 of Fig. 1;

Figs. 4 and 5 are fragmentary views of modifications of certain parts of the clutch and brake mechanism, and Figs. 4, 5 and 6 are fragmentary views of modifications of certain parts of the device.

A driving shaft 10 and a driven shaft 11 are supported in axial alinement by bearings in an enclosing casing (not shown) and the inner end of the driving shaft 10 is supported by the partition 12 as hereinafter described. There is also mounted within the casing a jack shaft 13 which is supported at one end by a bearing in the partition 12 and is supported at the other end by a bearing in the casing (not shown). The shaft 13 carries the gears 14, 15, 16 and 17 all of which are fixed to the shaft. Mounted on the driving shaft 10 are concentric sleeves or hollow shafts 18, 19 and 20, of which the sleeve 19 surrounds the sleeve 18 and the sleeve 20 surrounds the sleeve 19, all of the sleeves extending through the partition 12 and the sleeve 20 being directly supported thereby. A gear 21 is rotatably mounted on the shaft 10 and meshes with the gear 14. Gears 22, 23 and 24 are respectively carried by the sleeves 18, 19 and 20, the gear 22 meshing with the gear 15, the gear 23 meshing with the gear 16, and the gear 24 meshing with a gear 25 rotatably supported by the partition 12 between the gears 24 and 17, the gear 17 also being in mesh with the gear 25.

To the gear 21 is connected a disk 26 in the periphery of which is found a groove 26' which is helically inclined so as to provide in effect a left-hand thread over one-half the circumference and a right-hand thread over the remainder of the circumference. A collar 28 is fixed to the driving shaft 10 and is provided with extensions in which are pivotally mounted the clutch levers 29. Each clutch lever has a contacting surface comprising a ridge 30 which fits into the groove 26'. A collar 31 is slidably keyed to the drive shaft 10 and is moved back and forth on the shaft by means of a yoke 32 pivoted on the stud 33. The collar 31 is provided with a conical portion 34 which is adapted to engage the ends 35 of the clutch fingers 29 to rotate the fingers to locate the ridges 30 in the groove 26' of the collar 26. A spring 36 exerts force on the collar 31 tending to move it into operative position as shown in Fig. 1. With the collar 31 in operative position, the clutch fingers 29 grip the collar 26 and thereby connect the gear 21 to the shaft 10.

The sleeves 18, 19 and 20 are provided at their right-hand ends respectively with disks 37, 38, 39 and a similar disk 40 is fixed to the shaft 10. These disks are provided with peripheral grooves 37', 38', 39' and 40' of the same nature as the groove 26' of the disk 26.

A disk 41 is mounted on the driven shaft 11 and is provided with a hub 42 which is fixed to the shaft. Extensions 43 project from the disk 41 over the collars 37, 38, 39 and 40. Slides 45 are arranged in guide grooves provided in the extensions 43 and are provided with oblique slots 46 through which extend pins 47 carried by the extensions 43. A collar 48 is slidably mounted on the hub 42 and is provided with a plurality of slots in which are received the right-hand ends of the slides 45, these slides being grooved at 49 to receive portions of the collar 48 to attach the slides to the collar. The collar 48 is moved back and forth on the hub 42 by means of a yoke 50 pivoted on the pin 51 and a spring 52 opposes movement of the collar 48 toward the disk 41. Movement of the collar 48 effects combined longitudinal and radial movement of the slides 45.

Clutch members 53 are mounted for radial sliding movement in a collar 54 supported by sleeves 18, 19, and 20 for movement axially thereof. The clutch members 53 are provided with ridges 55 for engagement with any of the grooves 37', 38', 39' and 40' of the disks 37, 38, 39 and 40. The outer faces of the clutch members 53 have grooves in which are received the inner edges of the slides 45 so that inward movement of the slides 45 presses the clutch members 53 into locking engagement with one of the disks 37, 38, 39 and 40. The collar 54 has portions extending into enlarged inner portions of the slide grooves in the extensions 45 so that the collar 54 and disk 41 are connected to rotate in unison. Axial movement of the collar 54 is effected by means of the yoke 56 pivoted on the pin 57. The right-hand end of the shaft 10 extends into a hub 58 projecting from the disk 41, the hub being of sufficient length to leave a distance between the disk 40 and the disk 41 equal to the width of the disk 40.

Radially movable slides 59 are supported by the disk 41 and have apertures through which the slides 45 extend. At the outer end of each slide 59 there is provided a brake shoe 60 which is attached to the slide by means of the pin 61 and is adapted to engage a brake drum 62 fixed to the enclosing casing. The brake drum is provided with a groove 62' of the same nature as the groove 26' and each brake shoe is provided with a ridge 63 for engagement with the grooved drum 62. The outer edge of the slot in each member 60 is engageable by the outer edge of the slide passing therethrough to move the brake shoes outwardly into engagement with the brake drum when the slides 45 are in their extreme left hand position as shown in Fig. 1. A link 64 connects the yoke 59 with a suitable operating lever (not shown). A link 65 also connects the yoke 56 with a suitable operating mechanism (not shown). The link 65 has a slot 65' operating with a pin 32' in the yoke 32 so that the hub 31 is moved into inoperative position when the collar 54 is arranged with the clutch members 53 in register either with the disk 40 or the space between disk 40 and disk 39, but is moved into operative position by the spring 36 in all other positions of the disk 46.

In Fig. 1, the transmission is shown in neutral position with the brake applied, the collar 48 being held in contact with the disk 41 against the action of the spring 52 by proper operation of the link 64 and the collar 31 being held in operative position by the spring 36. There is no connection between the driving shaft 10 and the driven shaft 11 and the drive shaft 10 may now be rotated together with the gears 14, 15, 16 and 17 and their respective disks without affecting the driven shaft 11, as long as there is no engagement between the clutch 53 and the discs. By suitable movement of the collar 54, through the medium of the link 65 and yoke 56, the clutch fingers 53 may be arranged in position to engage any one of the disks 37, 38, 39 and 40. When the collar 54 is arranged in registration with any of the collars 37, 38, 39, the collar 31 is retained by the spring 36 in operative engagement with the clutch fingers 29 to lock the shaft 10 to the gear 21. Movement of the sleeve 48 under the influence of the spring 52 will move the slides 45 to the right and inwardly, thereby releasing the brake shoes and moving the clutch members 53 into locking engagement with the disk in registration therewith. Power will then be transmitted from the shaft 10 through the various sets of gears to the various disks and from the selected disk through the clutch fingers 53 and disk 41 to the shaft 11. If the clutch fingers grip the disk 37', the effective gears are the reverse speed gears. If the clutch fingers grip the sleeve 38', the effective gears are the low speed gears. If the fingers grip the disk 39, the effective gears are the intermediate speed gears. Direct drive or high speed is attained by engaging clutch members 53 with the disk 40. As above described, in such arrangement of the collar 54, the hub 31 is caused to move away from the collar 28 by reason of the right end of the slot 65' engaging the yoke 32, thereby releasing the gear 21 from the shaft 10. Power will then be transmitted from the shaft 10 through the disk 40, clutch members 53 and disk 41 to the shaft 11 and the various speed gears will remain stationary.

To put the transmission in any speed, the link 65 is moved, with the collar 48 so related to the disk 41 that the slides 45 are in such position that the clutch members are free to move out of declutching position to bring the clutch members 53 in register with the proper disk and then the link 64 is released to permit the spring 52 to slide the collar 48 to move the slides 45 to the right and bring the clutch members 53 into clutching engagement with the selected disk. Whenever it is desired to apply the brake, the link 64 is actuated to so move the disk 48 that the slides 45 move the brake shoes 60 into operative engagement with the drum 62. The operating means for the link 65 preferably are such that the disk 44 is moved to bring the clutch members successively into registration with the reverse speed disk 37, low speed disk 38, intermediate speed disk 39, space between disks 39 and 40, and direct drive or high speed disk 40.

Fig. 4 discloses a modification in the disk 26 and clutch levers 29, wherein the figure is provided with a peripheral inclined ridge 26'' and the clutch fingers 29 are provided with grooves 30'.

Fig. 5 discloses a modification of the speed disks 37 to 40 and the clutch members 53 in which the speed disks are provided with peripheral inclined ridges and the clutch members are provided with grooves. In this figure, only the disk 40 is shown and this figure is provided with the ridge 40'' which is received in the groove 55' of the clutch member 53.

Fig. 6 discloses a modification of the brake band 62 and brake shoes 60 in which the brake band is provided with a circular inclined ridge 62'' extending into grooves 63' in the brake shoes 69. The provision of helically inclined grooves or ridges in the various disks and clutch members insures firm clamping action. If the clutch members do not firmly grip the disk, there will be rotation of the disk relative to the clutch members which will cause a movement of the clutch members axially to the right or to the left, thus producing a wedging action between the inclined opposing surfaces of the ridges and grooves.

It is of course understood that various modifications may be made in the device above described, without in any way departing from the spirit of the invention as defined in the appended claims.

I claim:

1. In a speed change device, a driving shaft, a driven shaft, a plurality of coaxial disks driven at different speeds by said driving shaft, clutch means between said driving shaft and disks comprising a rotatable member, clutch levers pivotally supported by said driving shaft, said rotatable member and said clutch levers having inclined engaging surfaces and a wedge member movable axially of said driving shaft to engage said levers to force the same into clamping relation with said member, a plate fixed to said driven shaft and having projections, a collar movable axially of said disks and having slidable connections with said projections, radially movable clutch members carried by said collar, slides mounted in said projections and being connected thereto to cause radial movement of said slides upon longitudinal movement thereof, said slides overlying said clutch members and being adapted to move the same inwardly, said clutch members and disks having interengageable inclined surfaces, means to effect longitudinal movement of said slides, and means to effect axial movement of said collar and said wedge member.

2. In a speed change device, a driving shaft, a driven shaft, a plurality of coaxial disks driven by said driving shaft at different speeds, a plate fixed to said driven shaft and having projections, a collar movable axially of said disks and having slidable connection with said projections, radially movable clutch members carried by said collar, slides mounted in said projections for movement axially of said drive shaft and being connected to said projections to cause radial movement of said slides upon longitudinal movement thereof, said clutch members and said disks having inclined engaging surfaces and means for effecting longitudinal movement of said slides.

3. A speed change device according to claim 2, wherein the disks have inclined peripheral grooves and the clutch members have ridges engageable therewith.

4. A speed change device according to claim 2, in which the disks have inclined peripheral ridges and the clutch members have grooves engageable thereby.

5. A speed change device according to claim 2 in which the slides have oblique slots and the projections have fixed pins extending through said slots.

6. A speed change device according to claim 2 having a plurality of brake shoes carried by said plate for axial movement, a fixed brake drum, said brake shoes and drum having inclined engaging surfaces and said brake shoes being outwardly movable by said slides.

7. A speed change device according to claim 2 having a plurality of brake shoes carried by said plate for axial movement, a fixed brake drum, said brake drum having an inclined groove and said brake shoes having ridges engageable therewith, said brake shoes being movable outwardly of said plate by said slides.

8. A speed change device according to claim 2 having a plurality of brake shoes carried by said plate for axial movement, a fixed brake drum, said brake drum having an inclined ridge and said brake shoes having grooves in which said ridge is engageable, said brake shoes being movable outwardly by said slides.

JOHN WOLKOFF.